Patented Aug. 6, 1940

2,210,119

UNITED STATES PATENT OFFICE 2,210,119

ADHESIVE AND METHOD OF MAKING THE SAME

Earle R. Edson and George F. Mach, Gloucester, Mass., assignors to Russia Cement Company, Gloucester, Mass., a corporation of Massachusetts No Drawing. Application February 1, 1938, Serial No. 188,098

14 Claims. (Cl. 134—23.4)

This invention is an adhesive for envelope machines and similar uses, having dextrine as a base. It is covered broadly by our pending application Serial No. 120,931, filed January 16, 1937.

In our pending application we have described a dry mixture having dextrine as a base, mixed with a dry dispersing agent. This mixture is cold soluble, that is to say, if the mixture is stirred up with water at a normal temperature and allowed to stand a sufficient time the dextrine is completely dispersed and the whole mixture is suitable for use in envelope machines without heating.

The present invention comes within the terms of our pending application in that it is a dry mixture which is cold soluble and free-flowing enough in solution to operate well in an envelope machine and also adhesive enough even when prepared with cold water to perform the functions required of the liquid adhesives of an envelope machine but it is to be put into solution for the envelope machine in hot water and contains materials not necessary for a cold solution which are important and permit the use of heat in forming the liquid solution so that the liquid solution prepared with hot water as herein described for use in an envelope machine for closing the back seam of an envelope is a great improvement on all existing products of which we are aware for the purpose. This invention is rapidly displacing the gums heretofore used in envelope machines and the like. In this specification, we call the product of our invention our new back seam gum.

We take a dextrine which is only partially converted and therefore is only partially soluble in cold water, but nevertheless has had substantially all of its starch changed in its properties somewhat, and add to it a very large amount (41% more or less) of dry crystalline urea which, as stated in our pending application, has the effect of causing to disperse in water, dextrine which is not dispersible in cold water alone.

Unfortunately, however, not every dextrine which answers to the foregoing specifications is suitable for the manufacture of envelope gum according to our invention. The dextrine we have found most likely to be suitable is a well-known product made by Healey, Seaver Company and sold under the name "Fineco." This is a partially dextrinized flour having a polariscope test of about 7 and a solubility of about 28% in a 5% solution. A determination of this polarity value is made by mixing five (5) grams of dextrine with water, so that the total volume of solution is one hundred cubic centimeters. The solution must be made at a temperature not sufficient to cause a swelling of any insoluble or incompletely converted starch which exists in the dextrine being tested. After mixing the dextrine and water, as above described, the solution must be periodically shaken for a period of one hour, more or less. The solution is then filtered to remove the insoluble portions and the filtrate is filled into a 100 mm. observation or control tube. This filled tube is placed in a saccharimeter (we prefer the Bausch and Lomb saccharimeter) known as instrument #487, which contains a Lippich double prism polarizer with adjustable half shade angle and the Ventske scale based on the Bates-Jackson conversion factor of 34.620° for a normal weight of 26 grams of sucrose. A reading is then made of the degree of rotation with the solution at 20° C. Fineco is made by the addition of a catalyst to the flour and the application of heat and subsequently buffed with a suitable alkali, such as sodium carbonate, so as to be only slightly acid. Substantially every particle of flour is suitably changed by the treatment to some extent though only about 28% has become soluble in cold water.

Almost all Fineco will be suitable for the making of our new back seam gum but not necessarily so owing to the extraordinary variability of dextrines.

Accordingly, before manufacturing our new back seam gum in large quantities it is advisable to test the Fineco or other dextrine by carrying out the manufacture of back seam gum as hereinafter described, but in a very small quantity. When a small sample of back seam gum has been produced and made into a solution according to our invention it should be allowed to stand from one to four days to see whether it remains mobile and fluid or whether it has become pasty. If the small liquid sample has become pasty, even after four days, it is unsatisfactory for use in our new back seam gum and should be rejected.

The test may be made as follows. We make an intimate mix having the following composition:

| | Grams |
|---|---|
| Fineco, or other dextrine to be tested | 150 |
| Crystal urea | 60 |
| Powdered citric acid U. S. P. | 4.5 |
| Powdered sodium fluoride | .75 |

This intimate mixture is now stirred into 75 grams of water at a temperature of 200 to 212° F. There will be a substantial temperature drop, even below 170° F. The liquid mass is then elevated to a temperature of 170–175° F., at which time heating is discontinued. The liquid mass is then cooled, agitating while the cooling is taking place, until the temperature has dropped to 70° F. The liquid mass is then poured into a suitable container and sealed against the atmosphere. This sample is then allowed to remain at room temperature for a period of four days or longer and if at any time within the four days the liquid mass begins to show serious lack of mobility and fluidity, then the dextrine used is unsuitable for our invention.

However, as above stated, almost all Fineco will be suitable for our new back seam gum. Other dextrines which have been partially dextrinized so that almost every particle of flour has been suitably changed by treatment may, however, be used but they should only be used after making a test in accordance with the method hereinbefore described.

Having selected a dextrine which is suitable by the above, or any other tests, we may proceed to manufacture the new back seam gum in quantity as hereinafter described.

We intimately mix, with suitable equipment, the following composition:

| | Pounds |
|---|---|
| Fineco, or other suitable dextrine | 1000 |
| Crystal urea | 442 |
| Powdered citric acid, U. S. P. | 34.25 |
| Powdered sodium fluoride | 5.50 |

The amounts of the above materials are based on the use of bone dry Fineco and ordinary commercial crystal urea, citric acid and sodium fluoride. If the Fineco has substantial moisture there should be a correspondingly decreased amount of the other materials to secure the best results.

This mixture will then be suitable for use as a back seam gum for envelope machines. To prepare for use in an envelope machine it is treated as follows:

For the ordinary plunger type machine 100 lbs. of this dry intimate mixture is mixed with approximately 4 gallons of cold water at normal temperature, say 70° F., in suitable equipment. The mass is then agitated until it is smooth, homogeneous and free from lumps. When in this condition heat is applied so as to elevate the temperature of the liquid mass to 170–175° F. It would be best for this temperature to be attained within thirty to forty-five minutes from the beginning of the application of heat, though not absolutely necessary. It is then cooled to normal temperature, being agitated periodically, and at this time and for some time thereafter, is suitable for use in the ordinary plunger type machine.

In the case of the rotary machine, the same procedure as given above should be used except that instead of using four gallons of water to 100 lbs. of dry mixture, from six to eight gallons of water, more or less, should be used.

It is ordinary practice in preparing a solution for an envelope machine to cook both a heavy and a limpid, thin solution, suitable for diluting the heavy solution to fit the individual requirements of the machine, paper and operator. The thick and thin solutions are both taken to the machine in different containers and the operator uses his judgment as to mixtures in determining the consistency required for actual use in the machine. This same practice should be used in preparing our new back seam gum.

As stated above, back seam gum may be made suitable for envelope machines without heating the dry gum and water but we have found, and this is an important part of our invention, that the dispersion of the dry gum in hot water before use in the envelope machine accomplishes the result of making our back seam gum solution more adhesive. It is not easy nor safe to reason too much as to the causes of this but it is a fact that heating dextrine and urea and water partially decomposes the urea with a production of ammonia, thus making the liquid mixture remaining more alkaline, and any variation as to alkalinity and acidity of these adhesive dextrine mixtures is liable to cause an extraordinary difference in qualities. It is for this reason that in our pending application we prefer to prepare our gum with cold water without heating to avoid the undesirable results of changing the qualities of the liquid gum by heating.

In our present invention, however, heating is advised because with the materials we now use no harm is caused by the partial decomposition of the urea and the liquid back seam gum, instead of being injured, is helped by the heating.

The proportions of dextrine and urea above set forth are the best known to us to be used with the average batch of Fineco and should not be varied materially to secure the best results. The urea should be more than 20% of the dextrine and less than 50% to secure satisfactory results. However, if the dextrine used is more highly converted and has lower viscosity than Fineco then there should be diminution in the amount of urea used and a proportional decrease in the amount of citric acid and water. The correct proportion of urea and other materials to be used can be determined by the test of a small amount of the material, say, for instance, 150 grams, by the test above described. A large proportion of urea, at least 20% of the amount of dextrine, should be used. The amount of citric acid used can be varied considerably without harmful results but the amount of citric acid used should not be less than one twenty-second of the amount of urea used or harmful results are likely. The amount of citric acid used can be increased, however, very materially with only desirable results and we prefer to use about one-fifteenth of the amount of urea.

The citric acid is used because on heating dextrine and urea and water alone there is some decomposition of urea and tendency to form ammonia with the result that the product is made more alkaline. The citric acid, we have found, will prevent the harmful result from the decomposition of the urea and produce, when heated with Fineco and urea, a product superior to Fineco and urea alone whether dispersed in cold or hot water.

Tartaric acid may be used instead of, or mixed with, citric acid, with approximately equivalent results. If tartaric acid is used, the amount used should be the chemical equivalent of the citric acid, approximately. After many tests we have found that a group of organic carboxylic acids or their acid salts which are dry at normal temperatures, the group being made up of citric acid, tartaric acid and oxalic acid, will accomplish the desired result. Many other chemicals would neutralize the ammonia satisfactorily but would result in an inferior product for other reasons.

Suitable plasticising or softening agents, as glycerine, may be added to our back seam gum solution in preparing it for the machine, if required by peculiarity of the paper or climatic conditions.

Our back seam gum may also be used in attaching the glassine windows in window envelopes.

We have found that seams closed by our back seam gum are better than any seams of which we are aware in resisting atmospheric conditions and withstanding water, dampness and heat. This is particularly true in comparison with seams closed with dextrine sugar gums. Hitherto sugar gums have been the material most used in closing the back seam of envelopes difficult to cause to adhere.

Hitherto most easily adherent papers have often been closed by solutions of dextrine alone. Our back seam gum gives a far superior closure for all such envelopes so that even as to easily attached papers there will be great advantage in using our back seam gum so as to overcome the difficulties of meeting unfavorable atmospheric conditions.

Sodium fluoride may be entirely dispensed with without departing from our invention but nevertheless it has many advantages and we consider the use of it valuable. We prefer to use less than 1%.

Our new back seam gum is available for many other uses than closing the back seam in envelopes. It will be found excellent for many other machines than envelope machines.

In the claims, the word "Fineco" is used to mean "Fineco" which is suitable for use in the manufacture of our new back seam gum when tested as hereinbefore set forth.

In the claims "a suitable dextrine" is used to mean a partially converted dextrine which will answer the test for suitability for use in the manufacture of our new back seam gum when tested as hereinbefore set forth.

In the claims "a suitable organic acidic material" is used to mean either an organic carboxylic acid selected from the group consisting of citric, tartaric and oxalic acids, or an acid salt of one of these acids, said acidic material being dry at normal temperatures and conditions.

We claim:

1. A dry base for adhesive suitable for use in envelope machines and the like, comprising a partially converted dextrine which will not become pasty when tested as described in this specification, urea from 20% to 50% of the dextrine by weight, and a small amount of an organic carboxylic acidic material selected from the group consisting of citric, tartaric and oxalic acid and acid salts thereof, not less than one twenty-second of the amount of urea used.

2. A liquid adhesive suitable for use in envelope machines and the like comprising a partially converted dextrine which will not become pasty when tested as described in this specification, urea from 20% to 50% of the dextrine by weight and a small amount of an organic carboxylic acidic material selected from the group consisting of citric, tartaric and oxalic acid and acid salts thereof, not less than one twenty-second of the amount of urea used.

3. The method of making a liquid adhesive suitable for use in envelope machines which consists in mixing a partially converted dextrine which will not become pasty when tested as described in this specification, with urea from 20% to 50% of the dextrine by weight and a small amount of an organic carboxylic acidic material selected from the group consisting of citric, tartaric and oxalic acid and acid salts thereof and heating in sufficient hot water to about 170° to 175° F. until dispersed, and allow it to stand.

4. The method of making a liquid adhesive suitable for use in envelope machines which consists in mixing a partially converted dextrine which will not become pasty when tested as described in this specification, with urea from 20% to 50% of the dextrine by weight, and a small amount of an organic carboxylic acidic material selected from the group consisting of citric, tartaric and oxalic acid and acid salts thereof, not less than one twenty-second of the amount of urea used, and heating in sufficient hot water to about 170° to 175° F. until dispersed, and allow it to stand.

5. A liquid adhesive suitable for use in envelope machines and the like, comprising a partially converted dextrine which will not become pasty when tested as described in this specification, urea from 20% to 50% of the dextrine by weight, and small amount of a small amount of an organic carboxylic acidic material selected from the group consisting of citric, tartaric, and oxalic acid and acid salts thereof, not less than one twenty-second of the amount of urea used, dispersed in not more than four gallons of water for each one hundred pounds of the dry adhesive.

6. A dry base for adhesive suitable for use in envelope machines and the like, comprising a partially converted dextrine which will not become pasty when tested as described in this specification, urea from 20% to 50% of the dextrine by weight, and a small amount of citric acid.

7. A dry base for adhesives suitable for use in envelope machines and the like comprising a partially converted dextrine which will not become pasty when tested as described in this specification, urea from 20% to 50% of the dextrine by weight, and a small amount of citric acid.

8. A dry base for adhesives suitable for use in envelope machines and the like, comprising a partially converted dextrine which will not become pasty when tested as described in this specification, urea from 20% to 50% of the dextrine by weight, a small amount of an organic carboxylic acidic material selected from the group consisting of citric, tartaric and oxalic acids and acid salts thereof, and less than 1% of sodium fluoride.

9. A dry base for adhesives suitable for use in envelope machines and the like comprising a partially converted dextrine which will not become pasty when tested as described in this specification, urea about 40% to 45% of the dextrine by weight, a small amount of an organic carboxylic acidic material selected from the group consisting of citric, tartaric and oxalic acid and acid salts thereof, not less than one twenty-second of the amount of urea used.

10. A dry base for adhesives suitable for use in envelope machines and the like comprising a partially converted dextrine which will not become pasty when tested as described in this specification, urea about 40% to 45% of the dextrine by weight, a small amount of an organic carboxylic acidic material selected from the group consisting of citric, tartaric and oxalic acid and acid salts thereof, not less than one twenty-second of the amount of urea used, and less than 1% of sodium fluoride.

11. A liquid adhesive suitable for use in envelope machines and the like, comprising a partially converted dextrine which will not become pasty when tested as described in this specification, urea from 20% to 50% of the dextrine by weight, and a small amount of citric acid dispersed in hot water.

12. A liquid adhesive suitable for use in envelope machines and the like comprising a partially converted dextrine which will not become pasty when tested as described in this specification, urea from 20% to 50% of the dextrine by weight, and a small amount of citric acid and sodium fluoride dispersed in hot water.

13. A liquid adhesive suitable for use in envelope machines and the like comprising a partially converted dextrine which will not become pasty when tested as described in this specification, urea from 20% to 50% of the dextrine by weight, and a small amount of tartaric acid dispersed in hot water.

14. A liquid adhesive suitable for use in envelope machines and the like comprising a partially converted dextrine which will not become pasty when tested as described in this specification, urea from 20% to 50% of the dextrine by weight, and a small amount of tartaric acid and sodium fluoride dispersed in hot water.

EARLE R. EDSON.
GEORGE F. MACH.